(12) United States Patent
Ichino et al.

(10) Patent No.: US 7,977,443 B2
(45) Date of Patent: Jul. 12, 2011

(54) COPOLYMER RUBBER, RUBBER COMPOSITION AND RUBBER MOLDED PRODUCT

(75) Inventors: Kotaro Ichino, Ichihara (JP); Masao Kunizane, Sodegaura (JP); Takashi Hakuta, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 655 days.

(21) Appl. No.: 11/990,139

(22) PCT Filed: Aug. 9, 2006

(86) PCT No.: PCT/JP2006/315768
§ 371 (c)(1),
(2), (4) Date: Feb. 7, 2008

(87) PCT Pub. No.: WO2007/018245
PCT Pub. Date: Feb. 15, 2007

(65) Prior Publication Data
US 2010/0144997 A1      Jun. 10, 2010

(30) Foreign Application Priority Data

Aug. 10, 2005  (JP) ................................. 2005-231441

(51) Int. Cl.
*C08F 236/20*   (2006.01)
*C08L 19/00*    (2006.01)
(52) U.S. Cl. ......... 526/336; 526/282; 526/335; 524/554
(58) Field of Classification Search .................. 526/282, 526/336; 524/554
See application file for complete search history.

(56) References Cited

U.S. PATENT DOCUMENTS

| | | | | |
|---|---|---|---|---|
| 4,125,699 A | * | 11/1978 | Yamamoto et al. | ........ 526/169.2 |
| 4,510,303 A | * | 4/1985  | Oda et al.      | ........ 526/282   |
| 6,635,727 B1| * | 10/2003 | Koda et al.     | ........ 526/160   |

FOREIGN PATENT DOCUMENTS

| | | |
|---|---|---|
| JP | 11-509881    | 8/1999  |
| JP | 2001-011120  | 1/2001  |
| JP | 2001-151819  | 6/2001  |
| JP | 2003-160686  | 6/2003  |
| JP | 2004-115662  | 4/2004  |
| WO | WO 00/59962  | 10/2000 |

* cited by examiner

*Primary Examiner* — Fred M Teskin
(74) *Attorney, Agent, or Firm* — Foley & Lardner LLP

(57) ABSTRACT

The invention provides a copolymer rubber excellent in processability in kneading and processability in extrusion; rubber compositions containing the rubber; and crosslinked moldings of the compositions excellent in sealing properties and shape retention. A random copolymer rubber of ethylene (A), a $C_{3-20}$ α-olefin (B) and a nonconjugated polyene (C) which satisfies the following requirements (1) to (5): (1) the structural units (A) and (B) are contained at an (A)/(B) molar ratio of 40/60 to 95/5, (2) the structural unit (C) content is 0.01 to 5% by mole, (3) the limiting viscosity [η] is 1.0 to 5.0 dl/g as determined in decahydronaphthalene at 135°., (4) the Mw/Mn is 1 to 8, and (5) the P value is 0.46 to 1.00 as defined by formula (1): $P = Ln(\text{limiting viscosity } [\eta]) - 5.0 \times 10^5 \times \eta^*(10)$ (1) (wherein Ln is a natural logarithm; and $\eta^*(10)$ is viscosity (Pa·sec) as determined at 190° C. and at 10 rad/sec.

4 Claims, 3 Drawing Sheets

COPOLYMER RUBBER, RUBBER COMPOSITION AND RUBBER MOLDED PRODUCT

TECHNICAL FIELD

The present invention relates to a copolymer rubber comprising ethylene as one of the components, a rubber composition containing the copolymer rubber and a rubber molded product obtained by vulcanizing the rubber composition. In detail, it relates to a copolymer rubber and a rubber composition containing the copolymer rubber which are excellent in kneading processability and extrusion processability, and a rubber-molded product obtained by vulcanizing the rubber composition with excellent sealing and shape retention properties.

BACKGROUND ART

Ethylene-α-olefin rubbers such as an ethylene-propylene copolymer rubber (EPR), an ethylene-propylene-diene copolymer rubber (EPDM) and the like have no unsaturated bonds in the main chain of its molecular structure, so that they are superior to general purpose conjugated diene rubbers in terms of heat and aging resistance, weatherability, and ozone resistance and widely used in applications to automobile components, electric wire materials, electric and electronic components, building and construction materials, industrial component materials and the like.

However, recent demand for higher performance and higher functionality of components is directed to further improvement of properties and to improvement of the processability more than ever because of complexity of the components and in order to reduce process cost.

Reduction of polymer viscosity is sufficient to improve the kneading processability of EPDM. However, drastic reduction of the molecular weight of EPDM to reduce the polymer viscosity lowers sealability of vulcanized rubber products obtained, resulting in a problem of being impractical. Also known is a method to broaden a molecular weight distribution and a composition distribution to reduce the polymer viscosity, but causes problems such that vulcanized rubber products obtained tend to have a sticky surface and poor low temperature properties.

Viscosity reduction of a compound is also sufficient to improve extrusion processability of EPDM, particularly an extrusion throughput and surface appearance of extruded products. However, blending a large volume of oil or decreasing the molecular weight of EPDM drastically to reduce the viscosity of the compound lowers sealability and strength of vulcanized rubber products obtained, resulting in a problem of being impractical.

On the other hand, increase in the viscosity of the compound is sufficient to improve shape retention during extrusion of EPDM, but causes a problem such that an extrusion throughput is reduced and surface appearance of extruded products is deteriorated.

From the background mentioned above, Patent Document 1 discusses improvement of sealability and strength of vulcanized rubber products obtained while keeping kneading processability and extrusion processability of EPDM. However, the improvement is not satisfactory in terms of balancing their processability with sealability and strength of EPDM.

Patent Document 1: Pamphlet of WO 00/59962

DISCLOSURE OF THE INVENTION

Problems to be Solved by the Invention

An object of the present invention is intended to solve problems associated with the background art mentioned above and is to provide a copolymer rubber and a rubber composition manufactured therefrom which are excellent in kneading processability and extrusion processability, and a cross-linked molded product obtained from the composition having excellent sealability and shape retention.

Means for Solving the Problems

An ethylene copolymer rubber of the present invention is a random copolymer of ethylene (A), an α-olefin (B) having 3 to 20 carbon atoms and a non-conjugated polyene (C), and satisfies the following (1) to (5):

(1) the said ethylene copolymer rubber contains structural units derived from ethylene (A) and structural units derived from the α-olefin (B) having 3 to 20 carbon atoms in a molar ratio of 40/60 to 95/5 in terms of (A)/(B).

(2) the content of structural units derived from the non-conjugated polyene (C) is 0.01 to 5 mol % (provided that the sum of the structural units contained in the copolymer rubber is 100 mol %).

(3) the intrinsic viscosity [η] measured in decahydronaphthalene at 135° C. is 1.0 to 5.0 dl/g.

(4) the Mw/Mn is in a range of 1 to 8.

(5) P represented by the following formula is from 0.46 to 1.00.

$$P=\text{Ln}(\text{intrinsic viscosity}[\eta])-5.0\times10^{-5}\times\eta^*(10) \quad \text{(formula 1)}$$

wherein Ln is a natural logarithm and $\eta^*(10)$ is the viscosity (Pa·sec) measured at 10 rad/sec and at 190° C.

It is preferable that a part or all of the non-conjugated polyene (C) in the copolymer rubber of the present invention is 5-vinyl-2-norbornene (VNB) and the content of structural units derived from VNB is 0.01 to 0.4 mol % (provided that the sum of the structural units contained in the copolymer rubber is 100 mol %).

Further, the rubber composition of the present invention comprises the ethylene copolymer rubber and the rubber molded product of the present invention is obtained by vulcanizing the rubber composition.

Effect of the Invention

According to the present invention, an ethylene copolymer rubber is obtained, which keeps the same sealability, strength properties, heat and aging resistance, weatherability and ozone resistance after vulcanization as conventional rubbers and is provided with improved properties in kneading processability, extrusion processability and shape retention after vulcanization compared to conventional rubbers.

Further, according to the present invention, a rubber composition with excellent properties as noted above and a rubber-molded product with excellent properties obtained by vulcanizing the rubber composition are obtained.

BEST MODES FOR CARRYING OUT THE INVENTION

Figure 1:
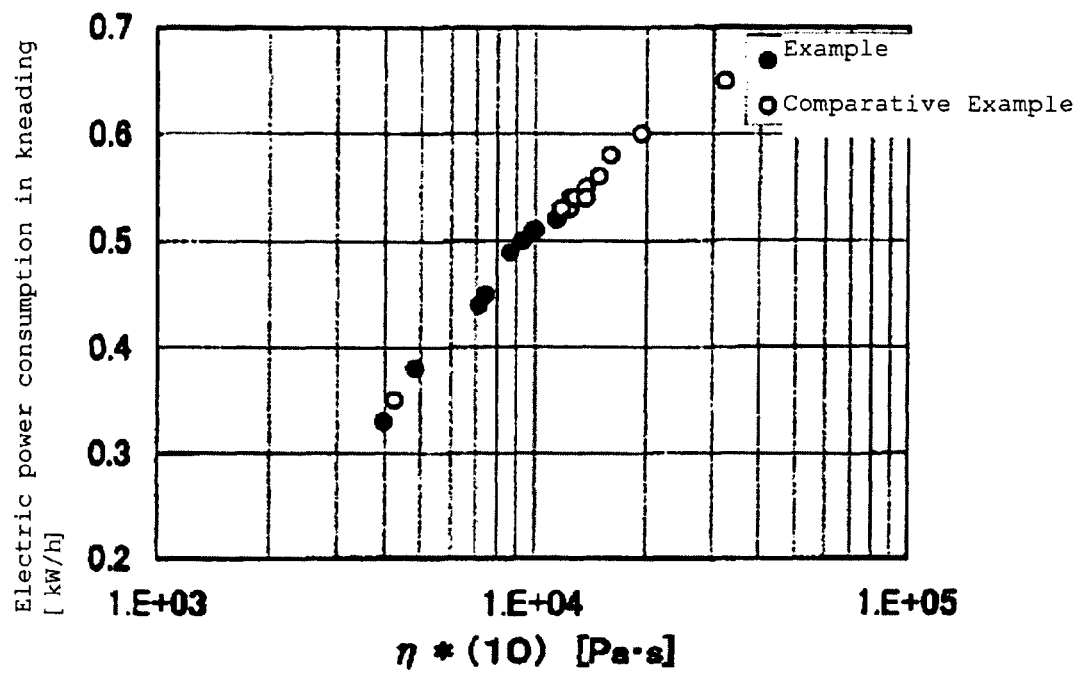
FIG. 1 is a drawing to illustrate a relationship between $\eta^*(10)$ and electric power consumption in kneading in Examples and Comparative Examples.

A copolymer rubber of the present invention is a random copolymer of ethylene (A), an α-olefin (B) having 3 to 20 carbon atoms and a non-conjugated polyene (C).

As the α-olefin (B) having 3 to 20 carbon atoms, not particularly limited, but for example, α-olefins having 3 to 10 carbon atoms such as propylene, 1-butene, 1-hexene, and 1-octene are particularly preferred.

The non-conjugated polyene (C) is a non-conjugated polyene having two or more carbon-carbon double bonds, preferably two in a molecule. Specific examples of the double bond include the double bond present at an end of a linear hydrocarbon, for example, the double bond in a vinyl group and allyl group, and the double bond present in a ring of an alicyclic hydrocarbon but not conjugated. Such a non-conjugated polyene does not include linear polyenes with vinyl groups at both ends. When one of two or more vinyl groups is a terminal vinyl group, the other vinyl group is preferably not at end, but located such that the non-conjugated polyene has a structure of an internal olefin.

Examples of the non-conjugated polyene (C) include aliphatic polyenes and alicyclic polyenes. The alicyclic polyene is preferably the polyene composed of an alicyclic portion having an unsaturated bond and a linear portion having a carbon-carbon double bond, and particularly preferably norbornene compounds having a substituent containing a carbon-carbon double bond such as 5-ethylidene-2-norbornene and 5-vinyl-2-norbornene. Furthermore, it is preferable that a part or all of the non-conjugated polyene (C) is 5-vinyl-2-norbornene (VNB) and the content of the structural units derived from VNB is 0.01 to 0.4 mol % (provided that the sum of the structural units contained in the copolymer rubber of the present invention is 100 mol %). The non-conjugated polyenes (C) may be used in one kind singly or two or more kinds in combination.

The molar ratio of the structural units derived from ethylene (A) to the structural units derived from the α-olefin (B) having 3 to 20 carbon atoms in the copolymer rubber of the present invention is 40/60 to 95/5 in terms of (A)/(B), preferably 55/45 to 75/25 in terms of (A)/(B).

The content of the structural units derived from the non-conjugated polyene (C) in the copolymer rubber of the present invention is 0.01 to 5 mol %, and preferably 0.1 to 4 mol % (provided that the sum of each structural units contained in the copolymer rubber is 100 mol %).

The intrinsic viscosity [η] of the copolymer rubber of the present invention measured in decahydronaphthalene at 135° C. is 1.0 to 5.0 dl/g, and preferably 1.0 to 4.0 dl/g. Keeping the viscosity in this range gives excellent kneading processability and particularly excellent sealability after vulcanization.

The Mw/Mn of the copolymer rubber of the present invention is in the range of 1 to 8. This Mw/Mn value is the value derived from a number average molecular weight (Mn) and a weight average molecular weight (Mw) determined based on an average molecular weight and a molecular weight distribution curve, which are obtained by GPC (gel permeation chromatography) measurement, using a calibration curve prepared using a standard ethylene-propylene copolymer (EPR).

For the copolymer rubber of the present invention, it is important to satisfy the condition that the value of the parameter P represented by the following formula 1 is from 0.46 to 1.00.

$$P = \text{Ln}(\text{intrinsic viscosity}[\eta]) - 5.0 \times 10^{-5} \times \eta^*(10) \quad \text{(formula 1)}$$

wherein Ln is a natural logarithm and η*(10) is the viscosity (Pa·sec) measured at 10 rad/sec and at 190° C.

Furthermore, the value of this parameter P is more preferably from 0.46 to 0.70. Keeping the value in the above range provides excellent shape retention and extrusion processability and particularly excellent sealability after vulcanization. This parameter P is obtained by measuring both η*(10) with a viscoelasticity measuring instrument and the intrinsic viscosity [η] noted above, and calculating according to formula 1 using each measured value.

Technical significance to specify this parameter P and an example of a procedure to adjust parameter P to a specific range are described below using FIGS. 1 to 3, which plot each data of Examples and Comparative Examples described later.

Figure 2:
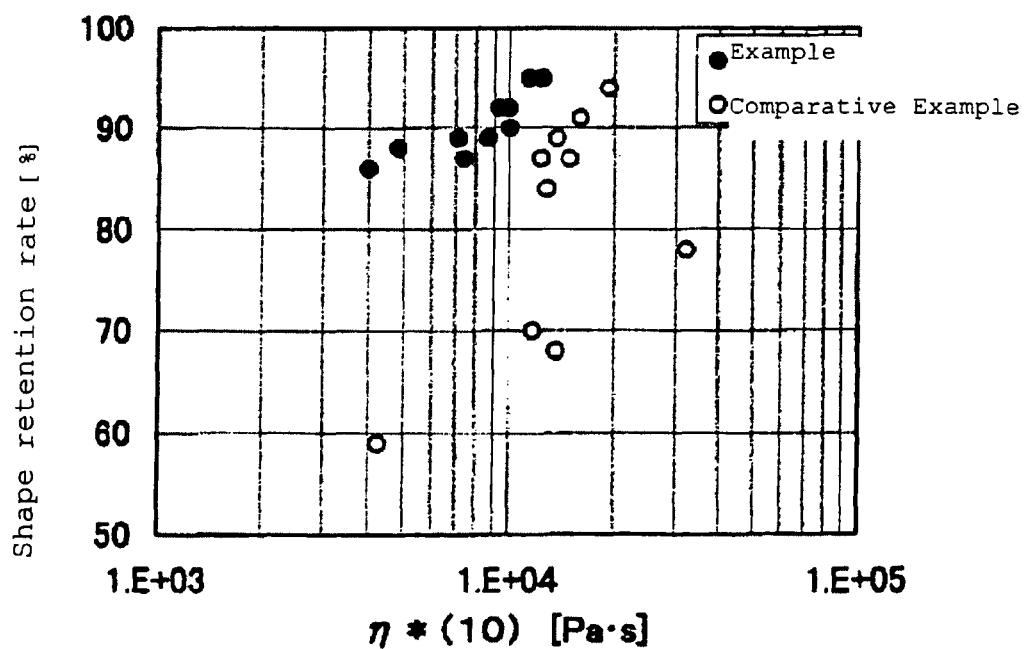
FIG. 2 is a drawing to illustrate a relationship between η*(10) and a shape retention rate in Examples and Comparative Examples.
Figure 3:
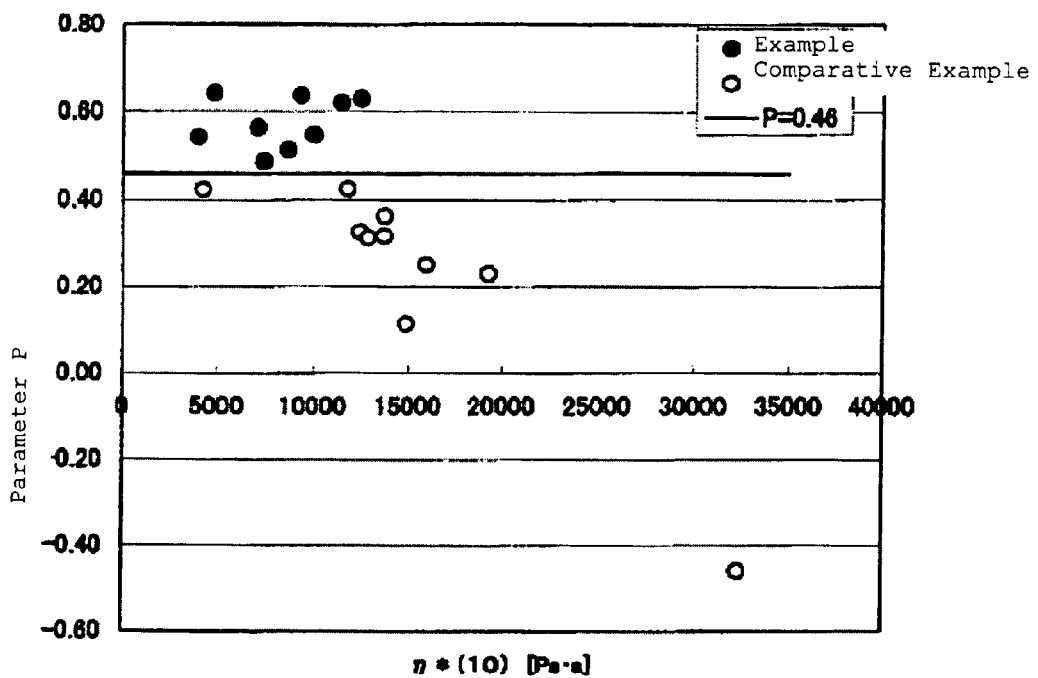
FIG. 3 is a drawing to illustrate a relationship between η*(10) and parameter P in Examples and Comparative Examples.

FIG. 1 illustrates a relationship between η*(10) and electric power consumption in kneading in Examples and Comparative Examples, FIG. 2 illustrates a relationship between η*(10) and a shape retention rate in Examples and Comparative Examples and FIG. 3 illustrate a relationship between η*(10) and parameter P in Examples and Comparative Examples.

First, as illustrated in FIG. 1, electric power consumption in kneading the copolymer rubber with other components becomes lower when η*(10) is low. Consequently, it can be understood that a lower value of η*(10) is desirable from a viewpoint of kneadability of the copolymer rubber. However, an object of the present invention is not limited to improve only kneadability, but is to provide the copolymer rubber excellent not only in kneading processability and extrusion processability but also in shape retention and sealability of the rubber-molded product obtained by vulcanization. Thus the object of the present invention cannot be achieved by specifying only the value of η*(10).

Next, FIG. 2 is a drawing to illustrate a relationship between η*(10) and a shape retention rate of the rubber-molded product after vulcanization. In this figure, it is understood that the higher the value of η*(10) is, the better the shape retention rate is when considering individual data of only Examples or only Comparative Examples. However, it is also understood that, when comparing the case of the parameter P satisfying the condition of the present invention (Examples) with the case not satisfying the condition (Comparative Examples), their shape retention rates demonstrate different patterns obviously expressing relative merits between them. Particularly, it is understood that the shape retention rate in Examples is much superior to that of Comparative Examples when the data are compared between Examples and Comparative Examples in which values of η*(10) are comparable. In the conventional technology, there is a fact that, when the rubber viscosity is lower, kneadability is improved but the shape retention rate is reduced, whereas when the rubber viscosity is higher, the shape retention rate is improved but kneadability is reduced. However, in the present invention, by keeping the value of parameter P in a specific range, it is possible to provide a copolymer rubber excellent in the two contradictory properties.

As a procedure to adjust the value of parameter P of the copolymer rubber for satisfying the condition of the present invention, simplest of all, there is a procedure to melt-knead the rubber copolymer under relatively mild conditions, for example, with an extruder used in usual pelletization. In this case, the intrinsic viscosity does not vary much under usual melt-kneading condition, but the value of $\eta^*(10)$ becomes smaller with the degree of kneading.

For example, plotting of parameter P against $\eta^*(10)$ of the copolymer rubber similarly as FIG. 3 is preferred before performing melt-kneading. A straight line with a slope of $-5.0 \times 10^{-5}$ passing through the point plotted is drawn to determine the value of $\eta^*(10)$ at the intersection point of this line with a horizontal line at P=0.46, serving as a target value of $\eta^*(10)$ to be reduced by melt-kneading. Such straight lines are roughly the same for the copolymer rubbers that are similar in the composition and manufacturing method and have the same intrinsic viscosity. Accordingly, the copolymer rubber of the present invention can be readily manufactured since the value of $\eta^*(10)$ to be targeted is readily determined.

Polymerization catalysts and polymerization conditions are not particularly limited in manufacturing the copolymer rubber of the present invention. Various catalysts previously known, for example, Ziegler-Natta catalysts, metallocene catalysts, imine catalysts, phenoxyimine catalysts and the like can be used as the polymerization catalyst. Polymerization methods previously known, for example, solution polymerization, slurry polymerization, bulk polymerization and so forth can be used as the polymerization method. Specifically, for example, it is preferred that continuously feeding each monomer into a reactor to proceed the copolymerization reaction in the presence of catalysts and at a given temperature, and isolating, drying and then melt-kneading an obtained copolymer rubber in order to adjust the parameter P.

The rubber composition of the present invention is the composition characterized by containing the copolymer rubber of the present invention described above as a major component. Components other than the copolymer rubber are not particularly limited and various added components previously known, for example, rubber reinforcing agents, fillers, softeners, antioxidants, process auxiliaries, vulcanizing agents, vulcanization accelerators, vulcanization auxiliaries, flame retardants and the like can be blended within a range not impairing the purpose of the present invention. Further, rubbers other than the copolymer rubber of the present invention may be blended. The content of the copolymer rubber of the present invention is preferably 20% by weight or more relative to the total of the rubber composition.

The rubber composition of the present invention can be prepared by, for example, kneading both the copolymer rubber of the present invention and other components at a given temperature using a kneader previously known such as Banbury mixers, kneaders, rolls and single-screw or twin-screw extruders. Such rubber composition (blended rubber) can be well prepared since the copolymer rubber of the present invention is superior in kneadability.

The rubber molded product of the present invention is the molded product characterized by being obtained by vulcanizing the rubber composition of the present invention. Vulcanization methods and vulcanization conditions are not particularly limited and methods and conditions previously known can be used. Specifically, the rubber molded product of the present invention can be obtained by, for example, molding the rubber composition in a desired shape using a molding machine such as extrusion molding machines, calender rolls, press machines, injection molding machines and transfer molding machines, and heating at a given temperature concurrently with or after molding. The molding process described above can be carried out well since the copolymer rubber of the present invention is superior in processability. Furthermore, the rubber molded product obtained is very useful as rubber products in various fields since it is also excellent in shape retention property and sealability.

EXAMPLES

The present invention is described below according to Examples, but not limited by these Examples. Methods for measuring properties in Examples and Comparative Examples are as follows.

(Measurement of Properties of Polymers)

(1) Content Ratio of Ethylene to α-olefin and Content of Non-Conjugated Polyene

The content ratio of structural units derived from ethylene and structural units derived from an α-olefin (molar ratio) and the content of structural units derived from a non-conjugated polyene were determined by measuring the intensity with a $^{13}C$ NMR spectrometer (provided that the sum of the content of each structural unit contained in the copolymer rubber is 100 mol %).

(2) Mw/Mn

The Mw/Mn was determined by GPC (gel permeation chromatography). Specifically, 30 mg of a sample was completely dissolved in 20 mL of o-dichlorobenzene at 145° C. and the solution obtained was filtered through a sintered filter with a pore size of 0.45 μm to use as an analytical sample, with which the measurement was carried out under the following conditions.

Apparatus: Alliance GPC 2000 (manufactured by Waters Corporation)

Column: TSKgel $GMH_6$-HT×2+TSKgel $GMH_6$-HTL×2, both having 7.5 mm I.D.×30 cm (manufactured by Tosoh Corporation)

Column temperature: 140° C.

Mobile phase: o-Dichlorobenzene (containing 0.025% BHT)

Detector: Differential refractometer

Sample concentration: 30 mg/20 mL

Injection volume: 500 μL

Sampling time interval: 1 sec

Column calibration: Monodispersed polystyrene (manufactured by Tosoh Corporation)

Software for data processing: Empower Professional (manufactured by Waters Corporation)

An average molecular weight and a molecular weight distribution curve were determined by GPC measurements to calculate a number average molecular weight (Mn) and a weight average molecular weight (Mw) using a calibration curve prepared using a standard ethylene-propylene copolymer (EPR) with a known molecular weight.

(3) $\eta^*(10)$

The value of $\eta^*(10)$ was measured using a viscoelasticity measuring instrument (Model RDS-2) manufactured by Rheometric Scientific Inc. Specifically, a sheet having a thickness of 2 mm pressed at 190° C. was molded into a disc with a diameter of 25 mm and a thickness of 2 mm to be used as a test specimen, with which measurement was made under the following conditions. The value of $\eta^*(10)$ is an indicator of extrusion processability and indicates excellent extrusion processability when this value is small.

Software for data processing: RSI Orchestrator (manufactured by Rheometric Scientific Inc.)
Geometry: Parallel plate
Measurement temperature: 190° C.
Frequency: 0.01-500 rad/sec.
Strain rate: 1.0%

Frequency dependence of the viscosity was measured under the above conditions and η*(viscosity) at 10 rad/sec was indicated by η*(10).

(Measurement of Properties of Unvulcanized Rubber)

(4) Scorch Time t5 and the Minimum Viscosity Vm

Change of Mooney viscosity was measured at 125° C. using a Mooney viscometer (Model SMV 202 manufactured by Shimadzu Corporation) to determine the minimum viscosity Vm after initiating measurement and further determine a time required to increase by five points from this minimum viscosity, which was assigned as the scorch time.

(Measurement of Physical Properties of Rubber Sponge (Tubular Sponge))

(5) Tensile Test

Figure 4:
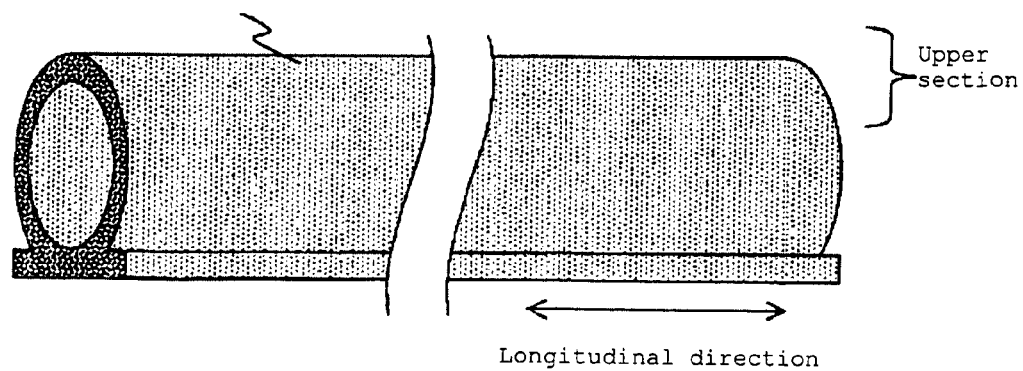
FIG. 4 is a schematic view of a rubber sponge (tubular sponge) used in Examples and Comparative Examples.

An upper section of a vulcanized tubular sponge with a shape illustrated in FIG. 4 was punched out in a longitudinal direction using a No.3 dumbbell according to JIS 6251 (1993) to yield a test specimen. The test specimen was used to run a tensile test under the conditions of a measurement temperature at 25° C. and a pull rate of 500 mm/min according to a method similarly defined in paragraph 3, JIS K6251, from which a tensile stress at break $T_B$ and a tensile elongation at break $E_B$ were determined.

(6) Measurement of Specific Gravity

An upper section of a vulcanized tubular sponge with a shape illustrated in FIG. 4 was punched out to make a test specimen of 20 mm×20 mm, and its surface was wiped with an alcohol to remove stains. This test specimen was mounted on an automatic densimeter (Model M-1 manufactured by Toyo Seiki Seisaku-Sho Ltd.) under an atmosphere of 25° C. to determine the specific gravity from a difference between the mass in air and that in purified water.

(7) Compression Set Test

A specimen obtained by cutting a vulcanized tubular sponge into a length of 30 mm in the longitudinal direction was fixed on a mold for measurement of compression set. The test specimen was compressed such that it became a half in height of the original test specimen before loading and the mold together with the specimen was placed in a gear oven at 70° C. for heat treatment for 22 hours and 197 hours, respectively. The test specimen was then taken out to allow cooling for 30 minutes, and the height of the test specimen was measured to calculate the compression set by the following calculation formula.

Compression set(%)=[$(t_0-t_1)/(t_0-t_2)$]×100

$t_0$: Height of the test specimen before test.
$t_1$: Height of the heat-treated test specimen after allowing for 30 minutes for cooling.
$t_2$: Height of the test specimen when mounted on the measurement mold.

(8) Measurement of Shape Retention Properties

Figure 5:
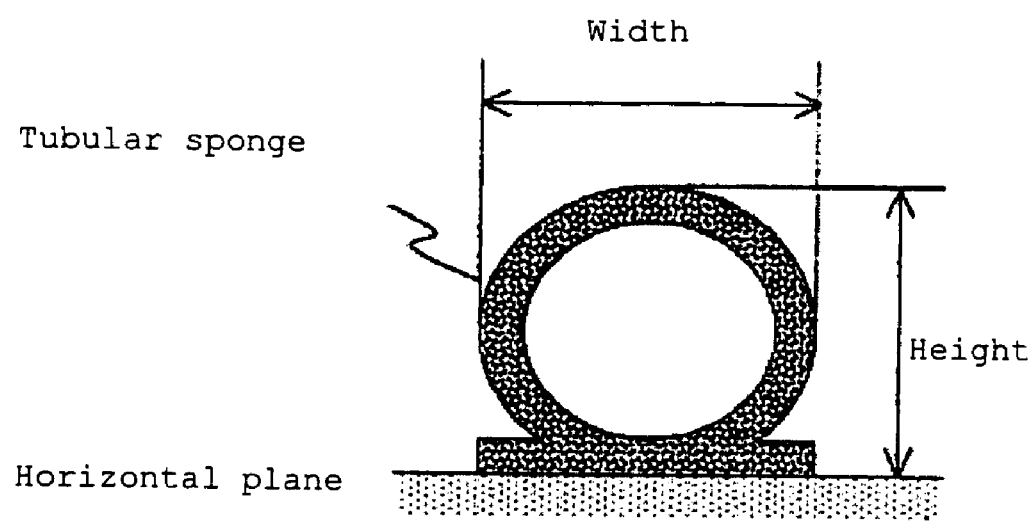
FIG. 5 is a schematic cross-sectional view of a rubber sponge (tubular sponge) used in Examples and Comparative Examples.

A vulcanized tubular sponge was placed on a plane surface as shown in FIG. 5, and a ratio of its cross-sectional height to the width was measured to determine a shape retention rate.

Shape retention rate(%)=$(L/D)$×100

L: Height of the tubular sponge
D: Width of the tubular sponge (9) Measurement of Surface Roughness Surface roughness of a rubber sponge (tubular sponge) was represented by converting unevenness of an external surface in the upper section of the rubber sponge (tubular sponge) into numerical terms using a contact stylus-type surface roughness measuring instrument. In practice, a tubular rubber sponge obtained as above was cut into 50 mm in length in the longitudinal direction and "the sum of the height of concave sections from minimum to the 10th from the minimum (h2)" in the sampled section was subtracted from "a sum of the height of convex sections from maximum to 10th from the maximum (h1)" to give a value of (h1−h2), which was divided by 10 to obtain the surface roughness of rubber sponge.

Example 1

Synthesis of quaternary copolymer rubber of ethylene/propylene/5-ethylidene-2-norbornene (ENB)/5-vinyl-2-norbornene (VNB)

Quaternary copolymerization reaction of ethylene, propylene, 5-ethylidene-2-norbornene (ENB) and 5-vinyl-2-norbornene (VNB) was continuously carried out using a polymerization vessel with a volume of 15 L and equipped with a stirring blade. Hexane as a polymerization solvent was continuously fed at a rate of 5 L/hr into an upper section of the polymerization vessel, while a portion of the polymerization solution was continuously withdrawn from the lower section of the polymerization vessel such that the polymerization solution in the polymerization vessel was constantly kept at 5 liters. $VOCl_3$ and $Al(C_2H_5)_{1.5}Cl_{1.5}$ were used as a catalyst. That is, $VOCl_3$ and $Al(C_2H_5)_{1.5}Cl_{1.5}$ were continuously fed into the polymerization vessel such that the concentration of the vanadium atom and the concentration of aluminum atom in the polymerization vessel were kept at 0.55 mmol/L and 3.3 mmol/L, respectively.

Ethylene and propylene as a monomer were continuously fed at a rate of 170 L/h and 375 L/h, respectively. ENB and VNB were also continuously fed such that each concentration in the polymerization vessel was kept at 7.5 g/L and 0.39 g/L, respectively. Hydrogen was used as a molecular weight regulator and fed into the polymerization vessel such that hydrogen concentration in the gas phase in the polymerization vessel was 3.1 mol %. Copolymerization reaction was carried out at 40° C. by circulating cooling water through an external jacket of the polymerization vessel.

The conditions described above were used for copolymerization reaction to yield a copolymer of ethylene, propylene, ENB and VNB in a form of a homogeneous solution. A small volume of methanol was added to the polymer solution withdrawn from the lower section of the polymerization vessel to terminate the polymerization reaction, and the obtained polymer was then steam stripped to separate from the solvent and dried under vacuum at 80° C. for a full day. The operation above produced the copolymer of ethylene, propylene, ENB and VNB at a rate of 265 g/hr.

The copolymer rubber obtained was in turn fed into a Model VG-50-30 extruder manufactured by Tanabe Plastic Machinery Co., Ltd., and was extruded at a screw rotation speed of 60 ppm. The temperature conditions for this extruder were set at 70° C. at F, 170° C. at C1, 210° C. at C2, 260° C. at C3, 260° C. at C4 and 180° C. at D. Specification of Model VG-50-30 extruder was as follows. Under these conditions, the extrusion throughput was 49 kg/hr, electric power consumption was 8.1 kWh and an indicator of energy, ESP, applied to 1 kg of the copolymer passing through the extruder was 0.165 kWh/kg. The copolymer rubber extruded was cooled with water at 20° C. immediately after extruded and then dried under vacuum at 80° C. for a full day.

Screw diameter: Φ=50 mm
L/D: 30/1
Screw rotation speed: 0 to 60 rpm
Main motor: 11 kW, VS motor, 1750 rpm (manufactured by Yasukawa Electric Corporation)
Power source: 200 V, 50 Hz, three phase
Heater: F: 1 kW, C1: 1 kW, C2: 1 KW, C3: 1 kW, C4, 1 kW and D: 0.7 kW In the copolymer rubber obtained, the molar ratio of ethylene to propylene was 67 to 33, the intrinsic viscosity [η] was 2.58 dl/g, the content of ENB was 2.42 mol %, the content of VNB was 0.10 mol %, Mw/Mn was 5.50 and η*(10) was 8660 Pa·sec. The results are shown in Table 1.

TABLE 1

|  | Example 1 | Example 2 | Example 3 | Example 4 | Example 5 |
|---|---|---|---|---|---|
| (Properties of copolymer) | | | | | |
| Ethylene/Propylene (molar ratio) | 67/33 | 70/30 | 67/33 | 71/29 | 67/33 |
| ENB (mol %) | 2.42 | 2.74 | 2.42 | 2.72 | 3.25 |
| VNB (mol %) | 0.10 | 0.27 | 0.10 | 0.11 | 0.24 |
| DCPD (mol %) | 0 | 0 | 0 | 0 | 0 |
| Mw/Mn | 5.50 | 6.98 | 5.87 | 3.88 | 4.05 |
| [η] | 2.58 | 3.30 | 2.86 | 2.36 | 2.85 |
| Index P $P = \mathrm{Ln}([\eta]) - 5.0 \times 10^{-5} \times \eta^*(10)$ | 0.51 | 0.62 | 0.55 | 0.49 | 0.55 |
| η*(0.01) | 1128700 | 1859805 | 1422641 | 783978 | 1408491 |
| η*(10) | 8660 | 11452 | 10054 | 7410 | 9954 |
| η* ratio(0.01/10) | 130.3 | 162.4 | 141.5 | 105.8 | 141.5 |
| (Operation of extruder) | | | | | |
| Screw rotation speed (rpm) | 60 | 60 | 60 | 60 | 60 |
| Electric power consumption (kW · h) | 8.1 | 9.1 | 8.2 | 7.8 | 8.8 |
| Extrusion throughput per hour (kg) | 49 | 48 | 49 | 50 | 48 |
| ESP (kW · h/kg) | 0.165 | 0.190 | 0.167 | 0.156 | 0.183 |

|  | Example 6 | Example 7 | Example 8 | Example 9 | Example 10 |
|---|---|---|---|---|---|
| (Properties of copolymer) | | | | | |
| Ethylene/Propylene (molar ratio) | 67/33 | 67/33 | 67/33 | 62/38 | 67/33 |
| ENB (mol %) | 2.42 | 2.42 | 2.42 | 2.25 | 2.42 |
| VNB (mol %) | 0.10 | 0.10 | 0.10 | 0.14 | 0.10 |
| DCPD (mol %) | 0 | 0 | 0 | 0 | 0 |
| Mw/Mn | 4.87 | 7.01 | 5.44 | 5.38 | 6.82 |
| [η] | 2.10 | 3.50 | 2.51 | 2.42 | 3.01 |
| Index P $P = \mathrm{Ln}([\eta]) - 5.0 \times 10^{-5} \times \eta^*(10)$ | 0.54 | 0.63 | 0.56 | 0.64 | 0.64 |
| η*(0.01) | 352539 | 2472570 | 912598 | 601211 | 1628600 |
| η*(10) | 3988 | 12450 | 7113 | 4829 | 9301 |
| η* ratio(0.01/10) | 88.4 | 198.6 | 128.3 | 124.5 | 175.1 |
| (Operation of extruder) | | | | | |
| Screw rotation speed (rpm) | 60 | 60 | 50 | 40 | 60 |
| Electric power consumption (kW · h) | 7.5 | 9.0 | 7.7 | 7.2 | 8.7 |
| Extrusion throughput per hour (kg) | 50 | 48 | 38 | 29 | 47 |
| ESP (kW · h/kg) | 0.150 | 0.188 | 0.203 | 0.248 | 0.185 |

Examples 2 to 10

In Example 1 various conditions for polymerization and extrusion were varied to yield the copolymer rubbers with different properties. The results are shown in Table 1.

Comparative Example 1

Copolymer rubbers obtained by copolymerization reaction under similar condition to Example 1 were used for measuring the properties of the polymer without extrusion. The values obtained are as follows: the molar ratio of ethylene to propylene was 67 to 33, the intrinsic viscosity [η] was 2.58 dl/g, a content of ENB was 2.42 mol %, the content of VNB was 0.10 mol %, Mw/Mn was 5.91 and η*(10) was 12411 Pa·sec. The results are shown in Table 2.

That is, 8 parts by weight of active zinc oxide ("META-Z102" manufactured by Inoue Calcium Co., Ltd.), 2 parts by weight of stearic acid, 112 parts by weight of carbon black ("Asahi 55G" manufactured by Asahi Carbon Co., Ltd.), 58 parts by weight of oil ("PS-43" manufactured by Idemitsu Kosan Co., Ltd.), 60 parts by weight of calcium carbonate ("WHITON SB" manufactured by Shiraishi Calcium Kaisha, Ltd.) and polyethylene glycol ("PEG4000S" manufactured by Sanyo Chemical Industries, Ltd.) were added to 100 parts by weight of the ethylene-propylene-ENB-VNB copolymer to knead using a 1.7 L Bambury mixer.

A kneaded product obtained was fed to 14-inch rolls (front roll temperature/back roll temperature=50° C./50° C.), to which 1.0 part by weight of a vulcanization accelerator ("San-

TABLE 2

| | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|
| (Properties of copolymer) | | | | | | | | | | |
| Ethylene/Propylene (molar ratio) | 67/33 | 70/30 | 67/33 | 71/29 | 67/33 | 69/31 | 78/22 | 72/29 | 66/34 | 66/34 |
| ENB (mol %) | 2.42 | 2.74 | 2.42 | 2.72 | 3.25 | 2.39 | 1.27 | 1.51 | 2.32 | 2.32 |
| VNB (mol %) | 0.10 | 0.27 | 0.10 | 0.11 | 0.24 | 0 | 0 | 0 | 0 | 0 |
| DCPD (mol %) | 0 | 0 | 0 | 0 | 0 | 0.29 | 0 | 0 | 0 | 0 |
| Mw/Mn | 5.91 | 7.87 | 6.07 | 4.03 | 3.82 | 6.97 | 2.48 | 5.65 | 3.91 | 4.82 |
| [η] | 2.58 | 3.30 | 2.86 | 2.36 | 2.85 | 2.60 | 3.18 | 2.76 | 1.89 | 2.73 |
| Index P $P = Ln([\eta]) - 5.0 \times 10^{-5} \times \eta^*(10)$ | 0.33 | 0.23 | 0.36 | 0.11 | 0.25 | 0.31 | −0.46 | 0.43 | 0.42 | 0.32 |
| η*(0.01) | 1556339 | 2980700 | 1901200 | 1357600 | 2157400 | 1619700 | 1618100 | 288240 | 55361 | 376870 |
| η*(10) | 12411 | 19290 | 13729 | 14879 | 15939 | 12845 | 32311 | 11776 | 4256 | 13717 |
| η* ratio (0.01/10) | 125.4 | 154.5 | 138.5 | 91.2 | 135.4 | 126.1 | 50.1 | 24.5 | 13.0 | 27.5 |
| (Operation of extruder) Screw rotation speed (rpm) Electric power consumption (kW·h) Extrusion throughput per hour (kg) EXP (kW·h/kg) | No treatment with extruder | | | | | | | | | |

Comparative Examples 2 to 10

In Comparative Example 1, various polymerization conditions were varied to yield copolymer rubbers with different properties. The results are shown in Table 2.

Examples 11 to 20
Preparation of a rubber composition from an ethylene-propylene-ENB-VNB copolymer and evaluation thereof The ethylene-propylene-ENB-VNB copolymer obtained above and other components were blended in amounts shown in Table 3 to prepare a blended rubber (composition) vulcanizate.

celer M" manufactured by Sanshin Chemical Industry Co., Ltd., compound name: 2-mercaptobenzothiazole), 1.0 part by weight of "Nocceler MDB (manufactured by Ouchishinko Chemical Industrial Co., Ltd., compound name: 2-(4'-morpholinodithio)benzothiazole), 2.0 parts by weight of "Sanceler BZ" (manufactured by Sanshin Chemical Industry Co., Ltd., compound name: zinc di-n-butyldithiocarbamate), 1.0 part by weight of "Sanceler 22-C" (manufactured by Sanshin Chemical Industry Co., Ltd., compound name: 2-mercaptoimidazoline), 1.5 parts by weight of sulfur, 3.0 parts by weight of p,p'-oxybis(benzenesulfonylhydrazide) and 8.0 parts by weight of calcium oxide were added to knead to yield a blended rubber (rubber composition).

This blended rubber was in turn extruded at a die temperature of 80° C. and a cylinder temperature of 60° C. in a tubular form using a 50 mm extruder equipped with a tubular die (internal diameter: 10 mm and wall thickness: 1 mm).

The molded product obtained was further vulcanized in a hot air vulcanizing cell at 250° C. for 5 minutes to yield a rubber sponge (tubular sponge). The rubber sponge (tubular sponge) obtained was used for the tensile test, the measurement of specific gravity, the compression set test, the measurement of shape retention properties and the measurement of surface roughness. The results are shown in Table 4.

TABLE 3

| (Composition) | (parts by weight) |
|---|---|
| Ethylene copolymer rubber | 100 |
| META-Z102 | 8 |
| Stearic acid | 2 |
| PEG4000S | 1 |
| Asahi 55G | 112 |
| WHITON SB | 60 |
| PS430 | 58 |
| Sanceler M | 1.0 |
| Nocceler MDB | 1.0 |
| Sanceler BZ | 2.0 |
| Sanceler 22-C | 1.0 |
| Sulfur | 1.5 |
| OBSH | 3.0 |
| Calcium oxide | 8.0 |

TABLE 4

| | Example 11 | Example 12 | Example 13 | Example 14 | Example 15 | Example 16 | Example 17 | Example 18 | Example 19 | Example 20 |
|---|---|---|---|---|---|---|---|---|---|---|
| Copolymer | Example 1 | Example 2 | Example 3 | Example 4 | Example 5 | Example 6 | Example 7 | Example 8 | Example 9 | Example 10 |
| (Properties of unvulcanized rubber) Mooney type viscometer (SMV202), 125° C. | | | | | | | | | | |
| Vm | 46 | 52 | 48 | 44 | 48 | 40 | 54 | 46 | 44 | 50 |
| t5 (min) | 3.9 | 3.5 | 3.8 | 3.9 | 3.6 | 4.5 | 3.4 | 4.0 | 3.9 | 3.7 |
| (Properties of sponge) | Hot air vulcanization (HAV). 250° C. × 5 minutes | | | | | | | | | |
| Specific gravity | 0.56 | 0.60 | 0.55 | 0.54 | 0.57 | 0.52 | 0.61 | 0.56 | 0.55 | 0.57 |
| Stress at break (Mpa) | 2.4 | 3.0 | 2.5 | 2.3 | 2.8 | 2.2 | 3.1 | 2.4 | 2.5 | 2.8 |
| Elongation at break (%) | 230 | 290 | 240 | 230 | 230 | 220 | 310 | 240 | 230 | 300 |
| Compression set (70° C. × 22 hr) (%) | 19 | 16 | 18 | 20 | 18 | 21 | 15 | 19 | 19 | 17 |
| Compression set (70° C. × 197 hr) (%) | 46 | 39 | 42 | 48 | 41 | 51 | 37 | 45 | 46 | 40 |
| Surface roughness (μm) | 14.1 | 11.5 | 14.8 | 13.8 | 13.6 | 13.2 | 14.5 | 14.0 | 13.8 | 14.6 |
| Shape retention rate (%) | 89 | 95 | 90 | 87 | 92 | 86 | 95 | 89 | 88 | 92 |

Comparative Examples 11 to 20

The copolymer rubbers obtained in Comparative Examples 2 to 10 were used to prepare and evaluate the rubber compositions of copolymers similarly as those in Examples 11-20. The results are shown in Table 5.

TABLE 5

| | Comp. Ex. 11 | Comp. Ex. 12 | Comp. Ex. 13 | Comp. Ex. 14 | Comp. Ex. 15 | Comp. Ex. 16 | Comp. Ex. 17 | Comp. Ex. 18 | Comp. Ex. 19 | Comp. Ex. 20 |
|---|---|---|---|---|---|---|---|---|---|---|
| Copolymer | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |

TABLE 5-continued

|  | Comp. Ex. 11 | Comp. Ex. 12 | Comp. Ex. 13 | Comp. Ex. 14 | Comp. Ex. 15 | Comp. Ex. 16 | Comp. Ex. 17 | Comp. Ex. 18 | Comp. Ex. 19 | Comp. Ex. 20 |
|---|---|---|---|---|---|---|---|---|---|---|
| (Properties of unvulcanized rubber) Mooney type viscometer (SMV202), 125° C. | | | | | | | | | | |
| Vm | 48 | 53 | 50 | 46 | 50 | 48 | 58 | 45 | 39 | 42 |
| t5 (min) | 3.9 | 3.4 | 3.7 | 3.8 | 3.5 | 4.2 | 4.9 | 5.8 | 4.5 | 4.3 |
| (Properties of sponge) | | | | | | | | | | |
| Specific gravity | 0.57 | 0.61 | 0.55 | 0.55 | 0.58 | 0.56 | 0.68 | 0.70 | 0.59 | 0.58 |
| Stress at break (Mpa) | 2.4 | 2.9 | 2.4 | 2.2 | 2.8 | 2.5 | 3.5 | 3.0 | 2.1 | 2.5 |
| Elongation at break (%) | 220 | 270 | 240 | 210 | 220 | 230 | 350 | 300 | 200 | 250 |
| Compression set (70° C. × 22 hr) (%) | 19 | 17 | 19 | 20 | 18 | 21 | 18 | 19 | 24 | 19 |
| Compression set (70° C. × 197 hr) (%) | 46 | 39 | 43 | 49 | 41 | 53 | 40 | 46 | 55 | 47 |
| Surface roughness (μm) | 14.5 | 12.1 | 14.8 | 14.0 | 13.8 | 15.5 | 15.9 | 17.4 | 14.8 | 14.7 |
| Shape retention rate (%) | 87 | 94 | 89 | 87 | 91 | 84 | 78 | 70 | 59 | 68 |

INDUSTRIAL APPLICABILITY

In the new and useful ethylene copolymer rubber, rubber compositions and rubber molded products related to the present invention, the copolymer rubber and rubber compositions can be widely used as a raw material for rubber products and are suitable for use as a rubber material for a sponge.

Specifically, the rubber material for a sponge is most preferably used as the material for weather stripping sponge and provides a weather stripping sponge well-balanced in shape retention, kneading processability and extrusion processability and excellent in sealability, strength properties, heat-aging resistance, weatherability and ozone resistance.

The invention claimed is:

1. A copolymer rubber that is a random copolymer of ethylene (A), an α-olefin (B) having 3 to 20 carbon atoms and a non-conjugated polyene (C), that has been melt-kneaded with an extruder, and that satisfies the following (1) to (5):
   (1) the said copolymer rubber contains structural units derived from ethylene (A) and structural units derived from the α-olefin (B) having 3 to 20 carbon atoms in a molar ratio of 40/60 to 95/5 in terms of (A)/(B),
   (2) the content of structural units derived from the non-conjugated polyene (C) is 0.01 to 5 mol % (provided that the sum of the structural units contained in the copolymer rubber is 100 mol %),
   (3) the intrinsic viscosity [η] measured in decahydronaphthalene at 135° C. is 1.0 to 5.0 dl/g,
   (4) the Mw/Mn is in a range of 1 to 8, and
   (5) P represented by the following formula is from 0.46 to 1.00, $$P = Ln \text{ (intrinsic viscosity } [\eta]) - 5.0 \times 10^{-5} \times \eta^*(10) \quad \text{(formula 1)}$$

wherein Ln is a natural logarithm and η*(10) is viscosity (Pa·sec) measured at 10 rad/sec and at 190° C.

2. The copolymer rubber according to claim 1, wherein a part or all of the non-conjugated polyene (C) is 5-vinyl-2-norbornene (VNB) and the content of structural units derived from VNB is 0.01 to 0.4 mol % (provided that the sum of the structural units contained in the copolymer rubber is 100 mol %).

3. A rubber composition comprising the copolymer rubber according to claim 1.

4. A rubber molded product obtained by vulcanizing the rubber composition according to claim 3.

* * * * *